United States Patent [19]

Fritsch

[11] Patent Number: 4,811,640
[45] Date of Patent: Mar. 14, 1989

[54] METAL SHEARING MACHINE

[76] Inventor: Rudy Fritsch, 7395 David Laurent, Riviére des Prairie, Quebec, Canada, H1E 3L5

[21] Appl. No.: 168,143

[22] Filed: Mar. 14, 1988

[51] Int. Cl.⁴ ............................................. B25D 7/02
[52] U.S. Cl. ........................................ 83/13; 83/36; 83/71; 83/206; 83/277; 83/364; 83/412; 83/620; 83/917; 269/73; 269/329; 271/228; 271/268; 414/749
[58] Field of Search .................. 83/13, 35, 36, 71, 209, 83/206, 277, 279, 360, 364, 409, 412, 620, 917; 269/73, 91, 329; 198/435; 414/677, 749; 271/228, 268

[56] References Cited

U.S. PATENT DOCUMENTS

| | | | |
|---|---|---|---|
| 3,691,887 | 9/1972 | Roch | 83/277 |
| 3,821,914 | 7/1974 | Roch | 83/155 |
| 3,828,639 | 8/1974 | Roch | 83/390 |
| 3,874,260 | 4/1975 | Roch | 83/27 |
| 3,877,332 | 4/1975 | Roch | 83/13 |
| 3,942,400 | 3/1976 | Roch | 83/13 |
| 4,213,733 | 7/1980 | De George et al. | 83/412 X |
| 4,297,927 | 11/1981 | Kuroda | 83/36 |
| 4,519,284 | 5/1985 | Hunter et al. | 83/410 |
| 4,548,115 | 10/1985 | Martin et al. | 83/409 |
| 4,691,817 | 9/1987 | Haar | 271/268 X |

Primary Examiner—Frank T. Yost
Assistant Examiner—Hien H. Phan
Attorney, Agent, or Firm—Fishman, Dionne & Cantor

[57] ABSTRACT

Two shearing blades disposed along two lines which intersect each other are carried on the bottom edges of two adjacent walls of a four-sided ram structure. The ram is supported at four points whereby to provide greater stability. The workpiece is carried on the aligned top surfaces of a fixed bed and a movable carriage. The movable carriages is movable in a first direction. Finger grippers, joined by a connecting bar, are movable in slots along the top surface of the movable carriage in a second direction. Thus, the workpiece is moved in the first direction by movement of the movable carriage and in the second direction by movement of the finger grippers. The workpiece may be precisely and accurately positioned under the shearing blades making use of sensors in each of the finger grippers and a lateral sensor at the end of the movable carriage. The drives for driving the movable carriage and the finger grippers are controlled by a processor which also receives feedback signals from the drives indicative of the distances moved by the movable carriage and the finger grippers.

8 Claims, 4 Drawing Sheets

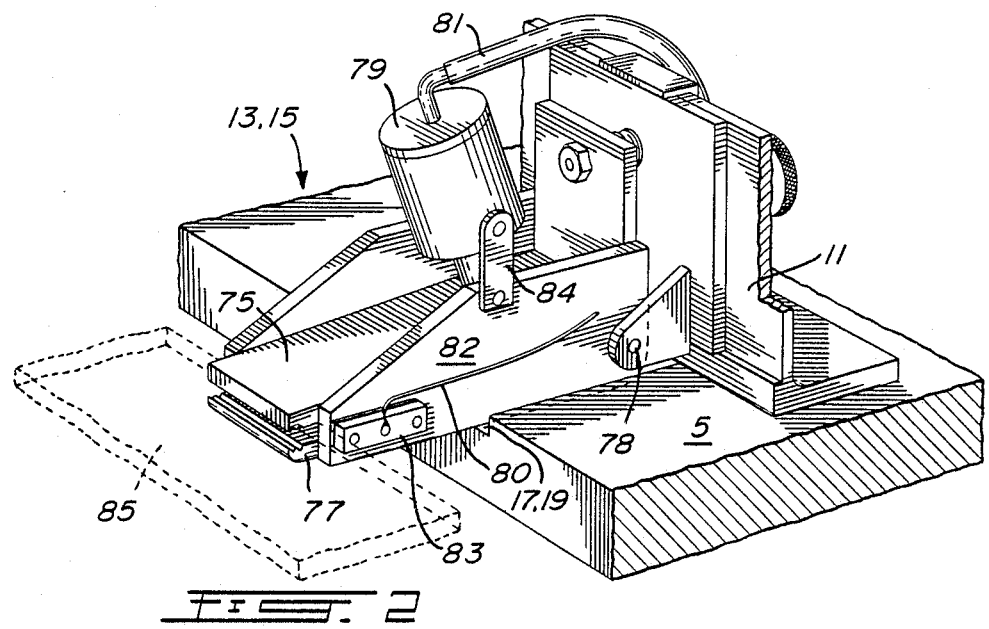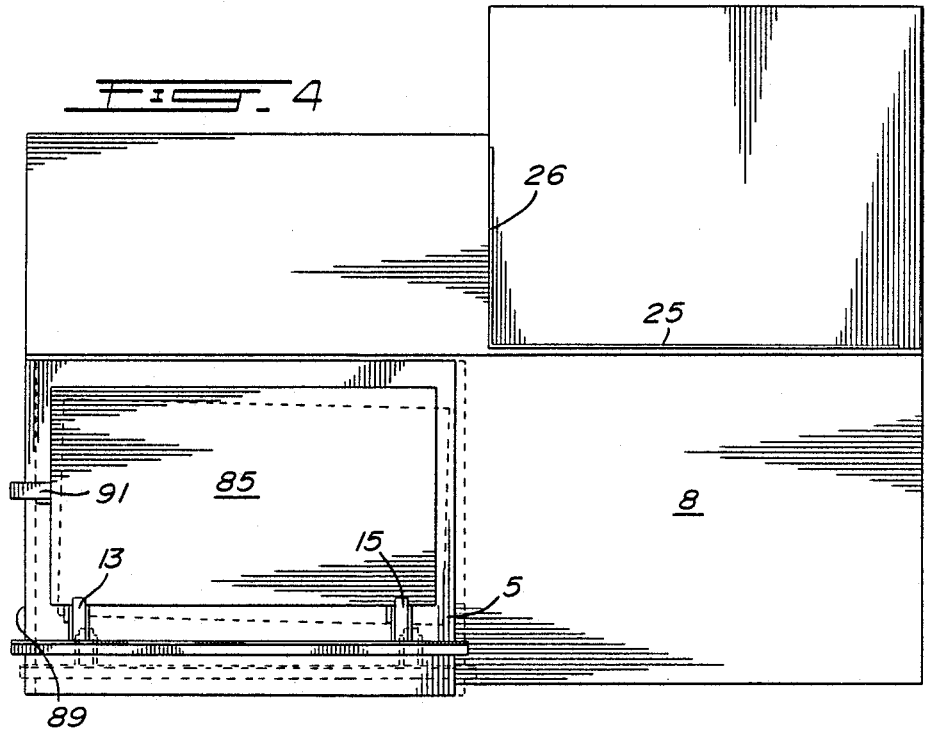

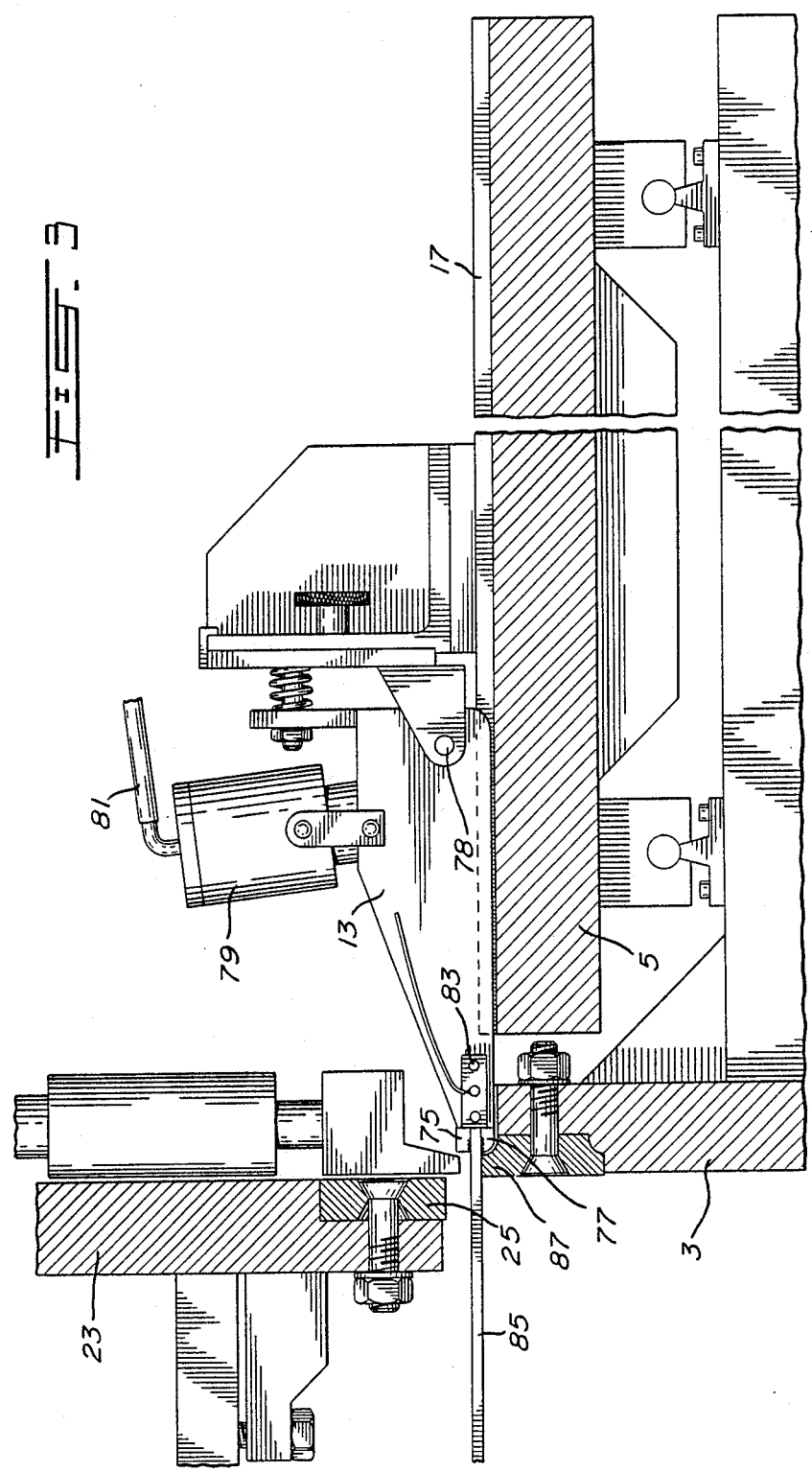

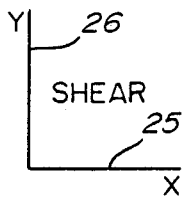
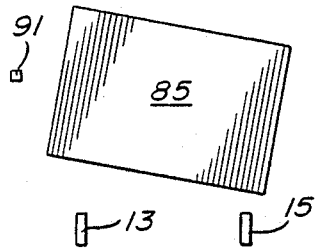
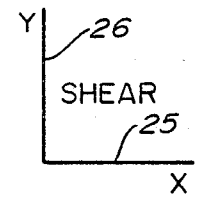
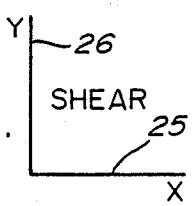
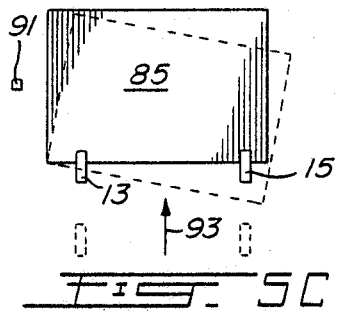
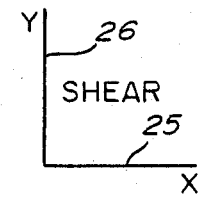
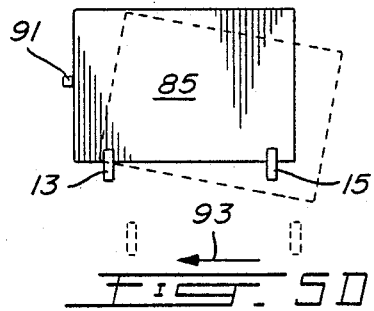

METAL SHEARING MACHINE

BACKGROUND OF INVENTION

1. Field of the Invention

The invention relates to a metal shearing machine which cuts a workpiece simultaneously along two intersecting lines.

More specifically, the invention relates to such a machine which provides a novel movable carriage means for the workpiece which ensures more accurate alignment of the workpiece with the shearing blades and permits the handling of heavier workpieces.

In addition, the invention relates to such a machine having an improved support and actuating system for the blade carrying ram.

Further, the invention relates to such a machine which includes means for sensing and manipulating the position of the workpiece on the carriage means whereby to more accurately align the workpiece with the cutting blades.

2. Description of Prior Art

Metal shearing machines which cut simultaneously along two intersecting lines are known in the prior art as illustrated in, for example, U.S. Pat. Nos. 3,691,887, Roch, Sept. 19, 1972, 3,821,914, Roch, Jul. 2, 1974, and 3,877,332, Roch, Apr. 15, 1975 (all of which are related patents and have the same teachings and are henceforth referred to as the Group I patents), U.S. Pat. Nos. 3,828,639, Roch, Aug. 13, 1974 and 3,942,400, Roch, Mar. 9, 1976 (which are related patents and have the same teachings and are henceforth referred to as the Group II patents), U.S. Pat. Nos. 3,874,260, Roch, Apr. 1, 1975, 4,297,927, Kuroda, Nov. 3, 1981 and 4,519,284, Hunter et al, May 28, 1985.

The Group I patents teach a machine having a three point support system for the blade carrying ram. With such a support system, the size of the blade which can be accommodated is limited as, with larger blades, shearing stability decreases thereby increasing distortions in the sheared material. The workpiece in the carriage 36. Fingers 38 are movable in the carriage 36 to move the workpiece 21 in the direction indicated by arrow 22 in FIG. 4 of these patents, and carriage 36 is movable in the direction transverse to the direction of arrow 22 to move the workpiece in the transverse direction. Because the fingers are carrying the full weight of the workpiece, the size (weight) of workpiece which can be handled by the machines according to the Group I patents is limited.

The Group II patents also teach a machine having a three point ram support. A workpiece is mounted on a table top 16 (see FIG. 1) and is gripped by grippers in carriage 17.

U.S. Pat. No. 3,874,260 teaches a method and apparatus for removing final blanks sheared from a sheet. A conveyor, adjacent the intersecting lower blanks, is tipped downward to accommodate the downward movement of the upper shearing blades, to thereby receive the sheared blank and convey it away from the blades. The problems dealt with by the present application are not dealt with in the '260 patent.

U.S. Pat. No. 4,519,248 teaches an arrangement similar to the arrangement of the Group I patents above-described. Specifically, grippers 44 and 46 (see FIG. 1 of the patent) are mounted on a carriage 42 for movement along the work table 40. A slider 41 (see FIG. 2) is also mounted on the carriage for movement across the work table. This complicated arrangement is used for the purpose of precisely positioning the workpiece. Once again, the full weight of the metal workpiece must be supported by the grippers 44 and 46.

U.S. Pat. No. 4,297,927 teaches a transverse gripper assembly 46 and a longitudinal gripper assembly 48 (see FIG. 1 of the patent). The workpiece is gripped by one gripper assembly at a time to move along the appropriate axis. Thus, if it is necessary to move the workpiece transversely, it is gripped by the gripper assembly 46 (but not the gripper assembly 48). To be moved in the longitudinal direction, it is gripped by the gripper assembly 48 (but not the gripper assembly 46). Thus, once again, a complicated arrangement is needed for precisely positioning the workpiece. Also, once again, the workpiece is supported solely by the grippers so that the size (weight) of workpiece which can be manipulated by these machines is limited as in the Group I patent.

SUMMARY OF INVENTION

It is therefore an object of the invention to provide an improved metal shearing machine which cuts a workpiece simultaneously along two intersecting lines.

It is a more specific object of the invention to provide such a machine having an improved support and activating system for the blade carrying ram thereof.

It is a further object of the invention to provide a machine of the above nature which provides a novel movable carriage means for the workpiece.

It is a still further object of the invention to provide a machine of the above nature which includes means for sensing and manipulating the position of the workpiece on the movable carriage means.

In accordance with the invention there is provided a metal shearing machine for cutting a workpiece simultaneously along two intersecting lines. The machine includes shearing means comprising two shearing blades disposed along two lines which intersect each other. A ram means carries the shearing means. Means are provided for supporting and activating the ram means to thereby move the ram means and the shearing means upwardly and downwardly. A means for supporting and activating supports the ram means at four points thereof.

In accordance with a further embodiment of the invention there is provided a metal shearing machine for cutting a workpiece simultaneously along two intersecting lines and including shearing means comprising two shearing blades disposed along two lines which intersect each other. The machine includes a table means for movingly supporting the workpiece. The table means comprises a fixed bed having a top surface and a movable carriage having a top surface, the top surface of the fixed bed being aligned with the top surface of the movable carriage means. The movable carriage means is movable in a first direction. A first slot in the top surface of the movable carriage means extends in a second direction transverse to the first direction, and a second slot in the top surface of the movable carriage means extending in the second direction parallel to the first slot. A first finger gripper is mounted in the first slot for movement along the first slot and a second finger gripper is mounted in the second slot for movement along the second slot. A bar means connects the first and second finger grippers to form a gripper arrangement whereby the first and second finger grippers are movable together. Whereby, when a workpiece is gripped by the finger grippers, it is movable in one direction by movement of the movable carriage, and it is movable in a second direction by movement of the gripper arrangement.

Each finger gripper preferably includes an upper and a lower jaw, the upper jaw being pivotable relative to the lower jaw. A sensor in each finger gripper senses when the workpiece is disposed between the upper and lower jaws of each finger gripper.

The invention also relates to a method for precisely and accurately aligning a workpiece in a desired position under the shearing blades of a metal shearing machine. The metal shearing machine includes a movable carriage means for carrying the workpiece, the movable carriage means being movable in a first direction by a first drive means. A gripper arrangement, comprising two spaced finger grippers connected by a connecting bar, is movable in a second direction, transverse to the first direction, along the top surface of the movable carriage by a second drive means. A processor provides actuating signals to the first and second drive means and receives feedback signals from the first and second drive means indicative of the distance moved by the movable carriage in the first direction and by the gripper arrangement in the second direction. Each finger gripper includes sensor means to sense when a workpiece is in the finger gripper, the output of the sensor means being fed to the processor. Each finger gripper also includes control means for effecting gripping of the workpiece when the workpiece is in the finger gripper, the control means being actuatable by the processor. The movable carriage is movable along the tracks from one end to the other end of a track bed, and a lateral sensor is disposed at the one end of the track bed, the output of the lateral sensor being fed to the processor. The method includes the steps of inputting the dimensions of the workpiece, the dimensions of the desired position of the workpiece under the shearing blades and the dimensions of the position of the lateral sensor into the processor. The workpiece is laid on the top surface of the movable carriage in a random position. The processor causes the second drive means to move the gripper arrangement in the second direction until the sensor means of one finger gripper senses that the workpiece is in the one finger gripper. The processor continues to cause the second drive means to drive the gripper arrangement in finger gripper senses that the workpiece is in the other finger gripper. The processor then ceases to cause the second drive means to drive the gripper arrangement and records the position of the gripper arrangement on the cessation of the second drive means. The processor also actuates the control means of both finger grippers to grip the workpiece. The processor then causes the first drive means to move the movable carriage towards the lateral sensor along the one direction until the lateral sensor senses the presence of the workpiece, whereupon the position of the movable carriage in the one direction is available to the processor. The processor ceases to cause the first drive means to drive the movable carriage, the workpiece now being in a start position. The processor, using the dimensions of the start position and the desired position, calculates the number of units the carriage must be moved in the first direction and the gripper arrangement must be moved in the second direction to place the workpiece in the desired position. The processor causes the first drive means to move the movable carriage the calculated number of units in the first direction and the second drive means to move the calculated number of units in the second direction, whereupon, the workpiece will underlie the shearing blades in the desired position.

BRIEF DESCRIPTION OF DRAWINGS

The invention will be better understood by an examination of the following description, together with the accompanying drawings, in which:

FIG. 2 illustrates in greater detail the gripper arrangement of the inventive machine;

FIG. 3 illustrates, in section, further details of the inventive machine;

FIG. 4 illustrates schematically the position of the lateral sensor; and

FIGS. 5A, 5B, 5C and 5D illustrate how the position of a workpiece is sensed using the gripper sensors and the lateral sensor.

DESCRIPTION OF PREFERRED EMBODIMENTS

Figure 1:
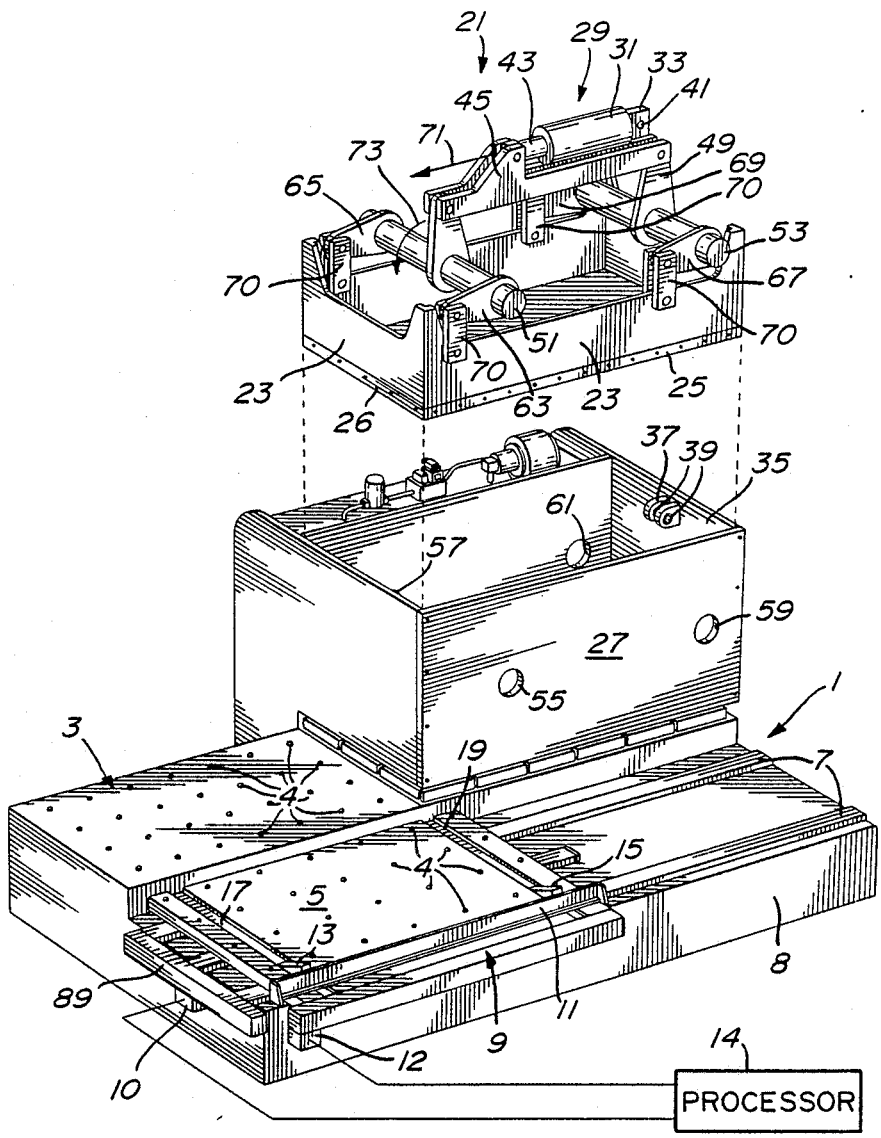
FIG. 1 is a perspective view of the inventive machine.

Referring to FIG. 1, the machine, illustrated generally at 1, comprises a table for movingly supporting a workpiece, the table comprising a fixed bed and a movable carriage 5. The top surfaces of the fixed bed and the movable carriage are aligned with each other, and the top surfaces of both the fixed bed and the movable carriage include a plurality of roller means so that a workplace can more easily slide over the top surfaces.

Movable carriage 5 is movable along tracks 7 mounted on a track bed 8 so that the movable carriage is movable in the X direction. Driver 10 provides the drive for moving the movable carriage 5. A gripper arrangement 9 is mounted for moving across the top surface of a movable carriage 5 in the Y direction. The gripper arrangement comprises a support bar 11 attached to gripper fingers 13 and 15. As can be seen, gripper finger 13 is mounted for movement in slot 17 in the top surface of 5 and along the Y direction, while gripper finger 15 is mounted for movement in slot 19, also in the top surface of movable carriage 5 and also extending in the Y direction. Support bar 11 ensures that both gripper fingers 13 and 15 move together and for the same distance. Driver 12 provides the drive for moving the gripper arrangement 9. The gripper arrangement will be more fully described below.

Both drivers 10 and 12 are under the control of a processor 14 and also provide feedback to the processor. Thus, processor 14 can cause driver 10 to move movable carriage 5 an accurate and precise number of units in the X direction, and the processor is aware of the number of units movable carriage 5 has moved in the X direction. In the same way, processor 14 can control driver 12 to move gripper arrangement 9 an accurate and precise number of units in the Y direction, and the processor 14 records the number of units moved by the gripper arrangement 9 in the Y direction.

The machine also includes a system indicated generally at 21, for supporting and actuating a ram 23. As can be seen, in a preferred embodiment, the ram comprises a four-walled structure, the walls being at an angle to each other and joined to each other at the ends thereof. The ram supports a shearing arrangement comprising shearing blade 25 and shearing blade 26. As can be seen, blades 25 and 26 extend along two intersecting lines and are mounted on two adjacent walls of the ram 23.

The system 21 is mountable in the enclosure 27 but is shown out of the enclosure for ease of description. The relationship between parts of the system 21 and parts of the enclosure 27 is described below.

The system 21 comprises a piston and cylinder arrangement 29 having a cylinder 31 whose free end 33 is attached to wall 35 of the enclosure by retainer 37. Holes 39 of the retainer and hole 41 of the free end of the cylinder are aligned and a rod, not shown, extends through the aligned holes whereby the system 21 is attached to the enclosure 27.

The free end of piston 43, of piston and cylinder arrangement 29, is connected to elongated carrier means 45, which is in parallel arrangement with cylinder arrangement 29. A bell crank 47 is pivotally connected to one end of the elongated carrier 45, and a bell crank 49 is pivotally connected to the other end of elongated carrier 45. Axle 51 extends transversely of and through bell crank 47 and is attached to the bell crank 47 so that axle 51 will rotate with the bell crank 47 when the bell crank 47 is pivoted. In a like manner, axle 53 extends transversely of and through and is attached to bell crank 49 to rotate when bell crank 49 pivots.

Bell crank 63 is attached to one end of axle 51 and bell crank 65 is attached to the other end of axle 51 such that the bell cranks will pivot when the axle rotates. In a like manner, bell crank 67 is connected to one end of axle 53 and bell crank 69 is connected to the other end of axle 53 to pivot with the rotation of the axle 53. The free ends of bell cranks 63, 65, 67 and 69 are pivotally connected to respective points of the ram 23 by links 70. Accordingly, ram 23 is connected to system 21 at four separate points. In the illustrated embodiment, the ram is a rectangular structure, and the bell cranks are connected to points on the long walls of the rectangle.

System 21 is mounted in enclosure 27 such that one end of axle 51 extends through opening 55 and the other end of axle 51 extends through opening 57. The axle 51 is rotatable in the openings 55 and 57.

In a like manner, one end of axle 53 extends through opening 59 and the other end of axle 53 extends through opening 61. Again, the axle 53 is rotatable in the openings 59 and 61.

In operation, when piston 43 extends out of cylinder 31 in the direction of the arrow 71, bell cranks 47 and 49 will pivot in the direction of arrow 73 causing axles 51 and 53 to rotate in the same direction. The rotation of axle 51, together with the forward movement of carrier means 45, will cause the ends of bell cranks 63 and 65, connected to links 70, to pivot downwardly. In a like manner, the ends of bell cranks 67 and 69, connected to links 70, will similarly pivot downwardly. This will, of course, cause the ram 23 to move downwardly in a shearing motion.

When piston 43 is retracted into cylinder 31 the direction opposite to the direction of arrow 71, bell cranks 47 and 49 will pivot in the direction opposite to the direction of arrow 73. Axles 51 and 53 will rotate in the same direction, and this rotation, together with the backward movement of carrier means 45, causes the ends of bell cranks 63, 65, 67 and 69, connected to links 70, to pivot upwardly and lift the ram.

Thus, the system 21, inasmuch as rt provides a four point support for the ram 23, and because of its unique structure, provides an improved support and actuating system which can handle longer shearing blades.

Turning now to FIG. 2, each gripper finger, 13 or 15, comprises an upper jaw 75 and a lower jaw 77. The upper jaw is pivotable relative to the lower jaw about the pivot point 78.

As shown in FIG. 2, and more clearly in FIG. 3, the top surface of the lower jaw is in alignment with the top surface of the fixed bed 3 and the movable carriage 5. Accordingly, the bottom surface of a workpiece 85 will lie smoothly on the aligned top surfaces of the movable carriage 5, the fixed bed 3 and the lower jaw.

A piston and cylinder arrangement 79 is provided for pivoting the upper jaw relative to the lower jaw. The cylinder of the piston and cylinder arrangement 79 is fixed to, for example, a sidewall 82 by a strap 84. Thus, when the piston of the piston and cylinder arrangement 79 is retracted, it will pivot the upper jaw 75 upwardly relative to the lower jaw 77, and when the piston of the piston and cylinder arrangement 79 is extended out of the cylinder, it will pivot the upper jaw 75 downwardly towards the lower jaw 77. A pressure hose 81 controls the operation of piston and cylinder arrangement 79.

Each gripper finger also includes a sensor 83 which can comprise, for example, a light sensitive transistor or a microswitch, and which senses the presence of the workpiece between the upper and lower jaws of the gripper finger. The output of each sensor is connected to processor 14 via cable means 80.

Turning to FIG. 3, it can be seen that the machine includes a lower blade 87. As is well known in the art, the lower blade is aligned with the upper blade 25, and a transverse lower blade (not shown) is aligned with upper blade 26. The space to the left of the blades is open so that, when the upper blades pass the lower blades in a downward movement of the ram, the workpiece 85 is sheared along the intersecting lines of the blades.

Turning now to FIG. 4, a sensor 91, whose output is connected to processor 14, is disposed at the end 89 of the track bed 8. The sensor 91, together with the sensors 83 of the gripper fingers 13 and 15, are used for determining an initial position of a workpiece 85 as is explained with respect to FIGS. 5A to 5D.

As seen in FIG. 5A, a workpiece 85 may be disposed in any random position on the top surface of the movable carriage 5. The gripping fingers 13 and 15 are then moved in the direction of the workpiece. The movement is caused by a drive 12 as is well known in the art, and the extent of movement is monitored and fed to a processor (not shown). As seen in FIG. 5B, one of the finger grippers will first reach the workpiece 85 (finger gripper 15 in FIG. 5B). The sensor of finger gripper 15 will provide information to processor 14 that the workpiece 85 is now in the finger gripper 15. Finger grippers 13 and 15 will continue moving in the direction towards the workpiece 85, i.e., in the direction of the arrow 93 in FIG. 5B.

As the finger grippers continue their movement, the right hand end of the workpiece, pushed by finger gripper 15, moves relative to the left hand end, and finger gripper 13 approaches the left hand end of the workpiece 85. Eventually, finger gripper 13 will reach the other end of workpiece 85 as shown in FIG. 5C. The sensor will provide this information to processor 14 which will, in turn, provide control signals to piston and cylinder arrangements 79 of finger grippers to cause finger grippers 13 and 15 to grip the left and right hand edges respectively of workpiece 85. Processor 14 now has the information that the workpiece is now within the grips of both finger grippers so that movement of the finger grippers in the direction of arrow 93 need no longer be continued.

Before the procedure had been started, the dimensions of the workpiece would have been fed to the processor 14. The distance that finger grippers 13 and 15 have moved in the Y direction has also been provided to processor 14 as above described, so that the Y position of all points of the workpiece can be calculated by, and is therefore known to, processor 14.

Movable carriage 5 is then moved in the X direction (the direction of the arrow 95) of FIG. 5D until sensor 91 senses that the edge of the workpiece is adjacent the sensor. As the position of the sensor 91 in the X direction would be provided to processor 14, the position of all points of the workpiece in both the X and the Y direction is known to processor 14.

The desired position of the workpiece under the shears 25 and 26 will also have been fed into processor 14. It therefore becomes a simple matter for the processor 14 to calculate the number of units which the movable carriage must move in the X direction, in a direction opposite to the arrow 95 of FIG. 5D, and in the Y direction in the direction of arrow 93, to locate the workpiece in the desired position under the shears 25 and 26.

Because of the fact that a workpiece is supported by the aligned top surfaces of the fixed bed 3, the movable carriage 5 and the bottom jaws 77, the machine can support a workpiece of substantial weight without any bending or other distortion of the workpiece.

Because the sensors 83 and 89 will accurately determine the initial position of the workpiece 85, and precision, the movement of both the movable carriage 5 and the gripper arrangement 9, the workpiece 85 can subsequently be accurately and precisely positioned under the shearing means for accurate and precise production of a sheared blank.

Although a particular embodiment has been described, this was for the purpose of illustrating, but not limiting, the invention. Various modifications, which will come readily to the mind of one skilled in the art, are within the scope of the invention as defined in the appended claims.

I claim:

1. A method for precisely and accurately aligning a workpiece in a desired position under the shearing blades of a metal shearing machine, said metal shearing machine comprising: a movable carriage means for carrying said workpiece, said movable carriage means being movable in a first direction by a first drive means; a gripper arrangement comprising two spaced finger grippers connected by a connecting bar, said gripper arrangement being movable in a second direction, transverse to said first direction, along the top surface of said movable carriage by a second drive means; a processor providing actuating signals to said first and second drive means and receiving feedback signals from said first and second drive means indicative of distance moved by said movable carriage in said first direction and by said gripper arrangement in said second direction; sensor means in each of said finger grippers to sense when the workpiece is in the finger gripper, the output of the sensor means being fed to said processor; each finger gripper including control means for effecting gripping of the workpiece when the workpiece is in the finger gripper, the control means being actuatable by said processor; said movable carriage being movable along the tracks from one end to the other end of a track bed, a lateral sensor being disposed at the one end of the track bed, the output of the lateral sensor being fed to said processor;

said method comprising:
inputting the dimensions of said workpiece into said processor;
inputting the dimensions of the desired position of the workpiece under said shearing blades into said processor;
inputting the dimensions of the position of said lateral sensor into said processor;
laying said workpiece on the top surface of said movable carriage in a random position;
said processor causing said second drive means to move said gripper arrangement in said second direction until the sensor means of one finger gripper senses that the workpiece is in said one finger gripper;
said processor continuing to cause said second drive means to drive said gripper arrangement in said second direction until the sensor means of said other finger gripper senses that the workpiece is in the second finger gripper;
said processor ceasing to cause said second drive means to drive said gripper arrangement;
said processor recording the position of said gripper arrangement on the cessation of the second drive means;
said processor actuating the control means of said first and second finger grippers to grip said workpiece;
said processor causing said first drive means to move said movable carriage towards said lateral sensor along said one direction until said lateral sensor senses the presence of said workpiece, whereupon the position of said movable carriage in said one direction is available to said processor;
said processor ceasing to cause said first drive means to drive said movable carriage;
said workpiece now being in a start positron;
said processor, using the dimensions of said start position and said desired position, calculating the number of units the carriage must be moved in the first direction and the gripper arrangement must be moved in the second direction to place the workpiece in the desired position;
said processor causing said first drive means to move said movable carriage the calculated number of units in the first direction and the second drive means to move the calculated number of units in the second direction;
whereupon, said workpiece underlies said shearing blades in said desired position.

2. A metal shearing machine for cutting a workpiece simultaneously along two intersecting lines and including shearing means comprising two shearing blades disposed along two lines which intersect each other, comprising:
table means for movingly supporting said workpiece;
said table means comprising a fixed bed having a top surface;
said table means further comprising a movable carriage means having a top surface;
the top surface of said fixed bed being aligned with the top surface of said movable carriage means;

said movable carriage means being movable in a first direction;

a first slot in said top surface of said movable carriage means extending in a second direction transverse to said first direction;

a second slot in said top surface of said movable carriage means extending in said second direction parallel to said first slot;

a first finger gripper mounted in said first slot for movement along said first slot;

a second finger gripper mounted in said second slot for movement along said second slot;

bar means connecting said first and second finger grippers to form a gripper arrangement, whereby said first and second finger grippers are movable together;

whereby, when a workpiece is gripped by said finger grippers, it is movable in said one direction by movement of said movable carriage, and it is movable in said second direction by movement of said gripper arrangement.

3. A machine as defined in claim 2 wherein each finger gripper includes a lower jaw having a top surface aligned with the top surface of said movable carriage; whereby, a workpiece lies on and is supported by the aligned top surfaces of the fixed bed, the movable carriage and the lower jaws.

4. A machine as defined in claim 3 wherein each finger gripper has an upper jaw pivotable relative to said lower jaw;

means for pivoting said upper jaw relative to said lower jaw.

5. A machine as defined in claim 4 wherein said means for pivoting said upper jaw relative to said lower jaw comprises a piston and cylinder arrangement.

6. A machine as defined in claim 5 wherein each finger gripper comprises a sensor to sense when the workpiece is disposed between the upper and lower jaws of said finger gripper.

7. A machine as defined in claim 6 wherein said movable carriage is movable along tracks from a first end to a second end of a track bed;

a lateral sensor disposed at one end of said track bed;

whereby, when a workpiece is sensed by said gripper sensors and said lateral sensor, the position of the workpiece on the table is established.

8. A machine as defined in claim 7 and including a plurality of rollers on the top surfaces of said movable carriage and said fixed bed wherein said workpiece is easily slidable along said top surfaces.

* * * * *